United States Patent [19]

Brown et al.

[11] 3,969,273

[45] July 13, 1976

[54] PROCESS FOR PREPARING PHOSPHATED ALUMINA EXTRUDATES

[75] Inventors: Stanley Monty Brown, Mount Airy; David Nelson Wallace, Columbia, both of Md.

[73] Assignee: W. R. Grace & Co., New York, N.Y.

[22] Filed: Apr. 24, 1975

[21] Appl. No.: 571,178

[52] U.S. Cl. .............................. 252/435; 252/437; 252/463; 252/465; 423/626
[51] Int. Cl.² .................... B01J 27/16; B01J 21/04; B01J 23/84
[58] Field of Search ........... 252/435, 437, 463, 465; 423/626

[56] References Cited
UNITED STATES PATENTS

| | | | |
|---|---|---|---|
| 2,441,297 | 5/1948 | Stirton | 208/136 X |
| 3,617,528 | 11/1971 | Hilfman | 252/435 X |

Primary Examiner—W. J. Shine
Attorney, Agent, or Firm—Joseph P. Nigon

[57] ABSTRACT

A process for the preparation of phosphate-containing extruded alumina catalyst supports is disclosed. Due to their particular characteristics, these supports find application in hydrocarbon conversion catalysts and especially in catalysts for the hydrotreating of petroleum feedstocks.

7 Claims, No Drawings

PROCESS FOR PREPARING PHOSPHATED ALUMINA EXTRUDATES

BACKGROUND OF THE INVENTION

Hydrocarbon conversion catalysts containing Group VIII metals, particularly cobalt or nickel, or compounds of these metals such as the oxides and or sulfides, Group VI metals, particularly molybdenum or tungsten, or compounds of these metals, and phosphorus on alumina or silica-stabilized alumina are well-known with regard to their hydrotreating activity.

U.S. Pat. Nos. 3,232,887 and 3,287,280 describe the use of phosphoric acid in the preparation of hydrotreating catalysts to stabilize impregnation solutions containing salts of the Group VI and Group VIII metals so as to more uniformly impregnate the catalyst support. U.S. Pat. No. 3,755,148 describes the use of a $P/MoO_3$ weight ratio of between 0.1 and 0.25 in the impregnation solution. U.S. Pat. No. 3,629,146 describes the use of hydrogen peroxide and phosphoric acid in the metals solution so as to permit the impregnation of greater amounts of metals onto the catalyst support.

U.S. Patent 3,617,528 describes the mixing of an alumina with a nickel salt and phosphoric acid before extruding, drying, and calcining. The catalyst so prepared contains 5 to 40% of the phosphorus component which is claimed to minimize the formation of nickel aluminate during the calcination step. Our invention differs in that the 1–10% phosphate present is an essential ingredient of the extruded alumina catalyst support and is not used to prevent formation of nickel aluminate. Furthermore, the calcined alumina support containing phosphate is prepared before the addition of any catalytically active metals and has a higher surface area and greater macroporosity than similarly prepared supports not containing phosphate.

Aluminum phosphate is precipitated onto an alumina gel in U.S. Pat. No. 2,441,297 so as to improve the heat stability and mechanical strength of the hydrotreating catalysts prepared with this base. However, no effect of the phosphate on fresh activity is found. An alumina hydrogel is contacted with a solution of phosphate ions prior to drying and calcining in Canadian Pat. No. 950,439. It is claimed to be essential that the phosphate ions be incorporated into the hydrogel before drying in order to influence the oxide structure formed during dehydration. Our invention differs in that the phosphate ions are added to a dried alumina gel resulting in a catalyst support which when processed into a hydrocarbon conversion catalyst exhibits improved activity as compared to conventional catalysts.

SUMMARY OF THE INVENTION

Catalyst supports finding application in hydrocarbon conversion catalysts and especially in catalysts for the hydrotreating of petroleum feedstocks are prepared by impregnating a dried gel-type alumina powder with a water soluble phosphate-containing compound prior to extruding, drying, and calcining. The extrusions have higher surface area and greater macroporosity than materials prepared in a similar manner but not containing phosphate. The calcined extrudates can be impregnated with catalytically active metals by known catalyst manufacturing techniques.

DETAILED DESCRIPTION OF THE INVENTION

According to the process of this invention, a dried gel-type alumina powder is impregnated with a water soluble phosphate-containing compound. The alumina can be prepared by any conventional procedure. Alumina is conventionally prepared by precipitating an aluminum salt such as alumino sulphate, nitrate and chloride within the pH of 6.5 to 10.5. A preferred method comprises the precipitation of an aluminum salt such as aluminum sulfate with an alkali metal aluminate such as sodium or potassium aluminate. The precipitation is carried out by the simultaneous addition of both solutions to a mixing tank with a pH of 6.5 to 10.5, a temperature of 90° to 190°F., and an alumina ($Al_2O_3$) concentration of 1 to 8%, preferably 2 to 7%, in the precipitation slurry. The precipitate can be aged for 1 to 3 hours at a temperature of 90° to 190°F. and then is washed free of anionic and cationic contaminants such as sodium and sulfate ions which might affect the performance of the product. The washed hydrogel is dried by any of the common drying procedures which include spray drying, rotary drying, tray drying, belt drying, or vacuum drying.

If it is desired to also include small quantities of silica, i.e., 2 to 5%, as a stabilizer in the gel being prepared, an alkali metal silicate, preferably sodium silicate, may be added to the sodium aluminate solution.

A solution of a phosphate-containing compound such as phosphoric acid or ammonium phosphate is added slowly while mulling the alumina powder to insure a very thorough mixing of the phosphate with the alumina. The amount of the phosphate-containing compound added depends on the phosphate concentration desired in the final catalyst. Our hydrocarbon conversion catalysts contain from 1 to 10%, $HPO_3$, preferably about 4–8%. The volume of solution to be added is controlled so as to give a material which extrudes easily.

The mulled material is then extruded at about 20 ft. lbs. torque, dried in a tray, belt or rotary drier, and calcined for 1 to 4 hours, preferably 2 to 3 hours, at a temperature of 1000° to 1400°F., preferably about 1300°F. The calcined extrudates of our invention have higher surface area and greater macroporosity than extrudates prepared in a similar manner but not containing phosphate.

The calcined extruded support can be impregnated with solutions of compounds of catalytically active metals by such known catalyst manufacturing techniques as spray or soak impregnation.

Salts of Group VI and Group VIII elements may be used to prepare hydrocarbon conversion catalysts. The preferred species of Group VI are molybdenum and tungsten while substances containing nickel and cobalt are preferred among the Group VIII metals. The compounds containing Group VI elements may be selected from molybdenum trioxide, ammonium molybdenate, tungstic acid, and ammonium metatungstate. Both water soluble and water insoluble salts of cobalt and nickel may be employed. The preferred salts of cobalt and nickel include the nitrates, the sulfates, the acetates and the like the iron Group VIII metal is present in a concentration 0.5 to 8% and the Group VIb metal is present in a concentration of 5 to 25% by weight of the final catalyst.

Our invention is illustrated by the following specific but non-limiting examples.

EXAMPLE 1

This example illustrates the use of phosphoric acid in the preparation of the phosphate-containing alumina base. While mulling 1645 g. of a dried gel-type alumina powder having a pore volume of 0.9 cc./g. in pores of less than 600A diameter as determined by the nitrogen isotherm method, 1930 g. of a 5.7% phosphoric acid solution was added slowly to insure proper dispersion of the phosphate on the alumina. The mulling was continued for a period of about ½ hour, and the material was then extruded at 22 ft. lbs. torque. The extrudates were oven dried at 230°F. for 16 hours and calcined for 3 hours at 1300°F. The calcined extrudates containing 5.6% phosphate and had a packed density of 0.42 g./cc., a surface area of 270 m.²/g. and a nitrogen pore volume of 0.67 cc./g.

EXAMPLE 2

This example illustrates the use of diammonium hydrogen phosphate in the preparation of the phosphate-containing alumina base. While mulling 1600 g. of the dried alumina powder, 1975 g. of an 8.9% diammonium hydrogen phosphate solution was added slowly. The mulling was continued for ½ hour, and the material was then extruded at 20 ft. lbs. torque. The extrudates were oven dried at 230°F. for 16 hours and calcined for 3 hours at 1300°F. The support contained 6.6% phosphate and had a packed density of 0.41 g./cc., a surface area of 287 m.²/g., a nitrogen pore volume of 0.70 cc./g. and a total pore volume as determined by the mercury porosimetry method of 0.91 cc./g.

EXAMPLE 3

A base containing no phosphate was prepared by the procedure described in Example 1 except that only water was added to the alumina during mulling. The calcined extrudates had a packed density of 0.48 g./cc., a surface area of 186 m.²/g., a nitrogen pore volume of 0.70 cc./g., and a mercury pore volume of 0.79 cc./g. Whereas this base, containing no phosphate, had a nitrogen pore volume equal to that of the phosphated bases, it had less macroporosity and a lower surface area.

EXAMPLE 4

This example illustrates the use of our phosphate-containing extruded alumina bases as supports for hydro-treating cataysts. The extrudates of Example 1 were impregnated to saturation with an ammoniacal solution of nickel nitrate and ammonium molybdate. The catalyst was dried for 16 hours and then calcined for 1 hour at 900°F. The product, designated Catalyst A, contained 2.4% NiO, 13.9% MoO₃, and 4.8% HPO₃. A catalyst, designated B, prepared in a similar manner. The base of Example 2 was used. The catalyst contained 2.9% NiO, 14.2% MoO₃, and 5.6% HPO₃. A catalyst was prepared using the base of Example 3, designated Catalyst C. This catalyst contained 2.5% NiO, 14.1% MoO₃ and no phosphate.

EXAMPLE 5

The three catalysts prepared in Example 4 were tested for hydrodenitrification activity using a feedstock containing 1900 ppm nitrogen, an average catalyst bed temperature of 740°F., a pressure of 1500 p.s.i.g., a hydrogen flow of 6000 SCF per barrel of feed, and liquid hourly space velocities of 2 and 4. The percent dentrification using each catalyst is shown in Table I.

Table I

| Feed Rate (LHSV) | Percent Denitrification | | |
|---|---|---|---|
| | A | B | C |
| Catalyst % HPO₃ phosphate | 4.8 | 5.6 | 0 |
| 2 | 88 | 88 | 85 |
| 4 | 63 | 67 | 61 |

It is obvious from the data in Table I that Catalysts A and B prepared using the bases of our invention have greater dentrification activity than Catalyst C, prepared using a standard alumina support.

What is claimed is:

1. A process for preparing extruded alumina catalyst supports containing 1 to 10% phosphate which consists essentially of the steps of:
    a. precipitating the aluminum salt selected from the group consisting of aluminum sulfate, nitrate, and chloride with sodium or potassium aluminate within a pH range of 6.5 to 10.5, within a temperature range of 90° to 190°F. and with an alumina concentration in the precipitation slurry of from 1 to 8%,
    b. washing the precipitate so as to remove contaminating cations and anions,
    c. drying the washed hydrogel, and recovering an alumina powder,
    d. adding a solution of water soluble phosphate containing compound, while mulling the alumina powder,
    e. extruding, drying and calcining the mulled material.

2. The process according to claim 1 wherein the water soluble phosphate-containing compound is phosphoric acid or ammonium phosphate.

3. The process according to claim 1 wherein the dried extrusions are calcined for 2 to 3 hours at 1300°F.

4. A process for preparing catalysts for hydrotreating petroleum feedstocks which comprise the steps of:
    a. precipitating an aluminum salt selected from the group consisting of aluminum sulfate, aluminum nitrate, aluminum chloride with sodium or potassium aluminate within a pH range of 6.5 to 10.5, within a temperature range of 90° to 190°F., and with an alumina ($Al_2O_3$) concentration in the precipitation slurrry of from 1 to 8%,
    b. washing the precipitate so as to remove contaminating cations and anions,
    c. drying the washed hydrogel, and recovering an alumina powder
    d. adding a solution of water soluble phosphate-containing compound while mulling the alumina powder,
    e. extruding, drying, and calcining the mulled material,
    f. impregnating the extrudates with solutions of salts of Group VIB and iron Group VIII metals,
    g. drying and calcining the catalyst.

5. The process according to claim 4 wherein the water soluble phosphate-containing compound is phosphoric acid or ammonium phosphate.

6. The process according to claim 4 wherein the iron Group VIII metal is present in a concentration of from 0.5 to 8 percent and the Group VIB metal is present in a concentration of from 5 to 25 percent by weight of the final catalyst.

7. The process according to claim 6 wherein the iron Group VIII metal is nickel or cobalt and the Group VIB metal is molybdenum or tungsten.

* * * * *